June 24, 1924.
M. H. SULLIVAN
PISTON AND PISTON RING
Filed Sept. 14, 1922
1,498,762
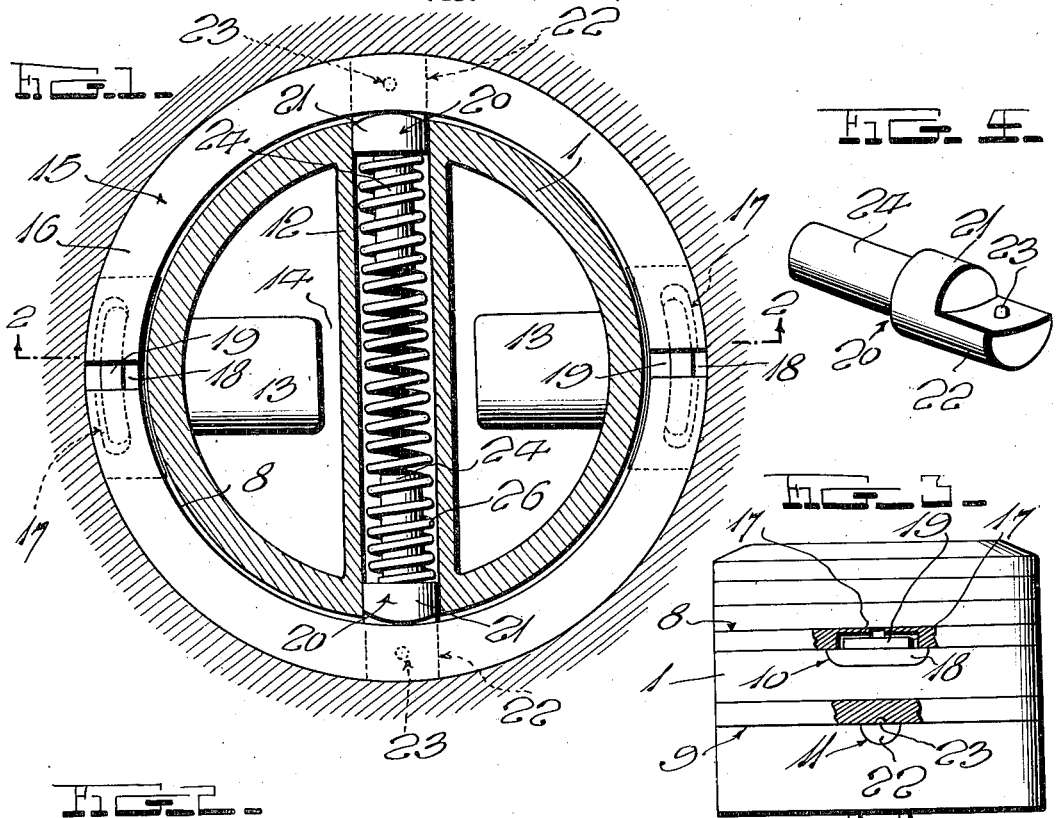
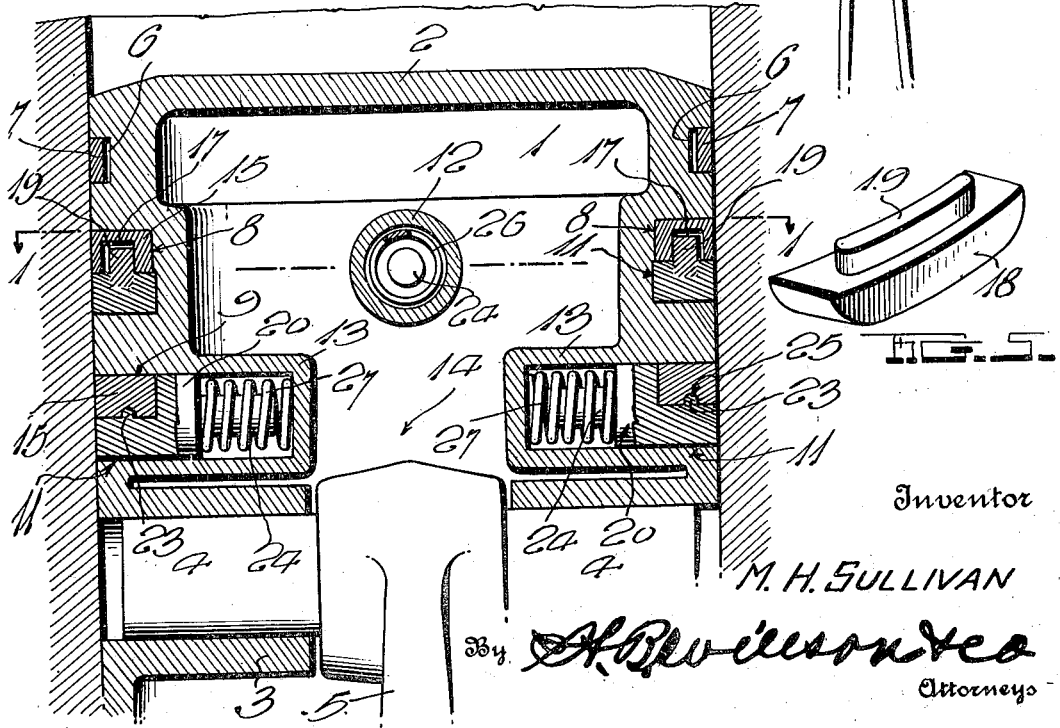
Inventor
M. H. SULLIVAN
By Attorneys Patented June 24, 1924.

1,498,762

UNITED STATES PATENT OFFICE.

MICHAEL H. SULLIVAN, OF POUGHKEEPSIE, NEW YORK.

PISTON AND PISTON RING.

Application filed September 14, 1922. Serial No. 588,246.

*To all whom it may concern:*

Be it known that I, MICHAEL H. SULLIVAN, a citizen of the United States, residing at Poughkeepsie, in the county of Dutchess and State of New York, have invented certain new and useful Improvements in Pistons and Piston Rings; and I do declare the following to be a full, clear, and exact description of the invention, such as will enable others skilled in the art to which it appertains to make and use the same.

This invention has reference to pistons and piston rings and is an improvement upon the device disclosed and claimed in the pending application of Michael H. Sullivan, Serial No. 475,543, filed June 6, 1921, and also the pending application of Michael H. Sullivan, Serial No. 511,910, filed October 31, 1921.

The improvements forming the subject matter of this application are directed to the type of hollow piston having packing ring grooves in which are disposed sectional packing rings which are yieldably forced outwardly by spring means mounted upon the inside of the piston. This spring means has usually been mounted in guides which extend diametrically across the piston, and where the piston is provided with two sectional rings of this character, they are placed so that the meeting ends of their sections are disposed out of registry and the guides for the spring means are disposed in crossed relation, one below the other.

To have the guides for the spring means which yieldably force the sections of the sectional packing rings outwardly disposed one below the other and both of them being continuous guides extending from one side of the piston to the diametrically opposite side, it requires considerable space in the interior of a piston and in a short piston it does not leave sufficient space to permit the connecting rod to be connected to the piston so as to permit swinging of the connecting rod within the piston. The present invention has been designed in order to provide a means whereby a construction of this general character may be embodied in a short piston so that the guides for the spring means will not interfere with the connectng rod of the piston.

According to the present invention, sealing blocks are coupled to the meeting ends of the sections of the sectional packing rings. These blocks are coupled to the meeting ends of the ring sections in such a manner that they will be maintained by the ring sections in engagement with the cylinder wall. The spring means which yieldably forces the ring sections outwardly and maintains them in engagement with the cylinder wall acts upon the intermediate portions of the ring sections. Associated with this spring means are plungers which according to the present invention are connected in a novel manner to the intermediate portions of the ring sections so that the latter are maintained centered about the piston. The novel construction also causes the rings to press uniformly throughout their circumferential extent upon the cylinder wall. This is a result whch never has been attained before.

The novelty in the invention resides in the various features of construction and the combination and arrangement of parts, which are hereinafter fully described and claimed and shown in the accompanying drawings.

In the accompanying drawings forming a part of this specification:—

Fig. 1 is a transverse sectional view across a piston constructed in accordance with the present invention, said view being taken substantially on the plane indicated by the line 1—1 of Fig. 2;

Fig. 2 is a longitudinal sectional view of the piston illustrated in Fig. 1, said view being taken substantially on the plane indicated by the line 2—2 of Fig. 1;

Fig. 3 is a side elevation, partly broken away and in section, of the piston;

Fig. 4 is a perspective view of one of the plungers which form a part of the device, and Fig. 5 is a similar view of one of the sealing blocks which form a part of the device.

In the illustrated embodiment of the invention, the numeral 1 designates the piston of an internal combustion engine. The piston 1 is of the hollow type having one of its ends open and being provided with a head 2 at its other end. Extending inwardly from the diametrically opposite sides of the piston 1 at points located between the ends of the latter are tubular members 3 which constitute bearings for the ends of the piston or wrist pin 4, which connects the upper end of the connecting rod 5 to the piston.

At a point adjacent the head 2, the piston 1 is provided with a packing ring groove 6. The groove 6 is comparatively shallow and in this is disposed an ordinary snap packing ring 7.

Below the ring groove 6, the piston 1 is provided with a pair of comparatively deep packing ring grooves 8 and 9. One of the walls of the grooves 8 and 9 at diametrically opposite points are cut away so as to form comparatively long recesses 10. The diametrically opposite recesses 10 in the groove 8 are disposed out of alinement or registry with the diametrically opposite recesses 10 of the groove 9. Preferably the recesses 10 of the groove 8 and the recesses 10 of the groove 9 are arranged around the wall of the piston 1 at intervals of about 90°.

One of the side walls of the grooves 8 and 9 are cut away at diametrically opposite points so as to form comparatively short semi-circular recesses 11. The recesses 11 of each groove are disposed midway between the recesses 10 of that groove, so that the recesses 11 of one groove 8 or 9 are disposed out of alinement or registry with the recesses 11 of the other groove. Thus, it will be seen that the recesses 11 of one of the grooves 8 and 9 are spaced around the wall of the piston 1 upon arcs of about 90° from the recesses 11 of the other groove.

Extending transversely across the interior of the piston 1 and preferably formed integrally therewith is a tubular guide 12. The guide 12 has its ends open and they are disposed adjacent and in communication with the packing groove 8 and the recesses 11 formed therein.

Below the guide 12, the piston 1 is provided with a pair of inwardly extending tubular guides 13. The guides 13 are preferably formed integrally with the piston 1 and extend at right angles to the guide 12 from diametrically opposite sides of the pistons. They are comparatively short and have closed inner ends which are spaced apart so as to form a space 14 immediately beneath the guide 12. The outer ends of the guides 13, which are open, communicate with the groove 9 and the recesses 11 formed therein.

Disposed in the ring grooves 8 and 9 are comparatively wide packing rings 15. The packing rings 15 are each made in two semi-circular sections 16. The sections 16 have arcuate grooves 17 in one of their sides and at their ends. The grooves 17 extend entirely to the ends of the sections 16 so that the ends of the grooves of one section are disposed opposite the ends of the grooves of the other section of the same ring.

Disposed in the recesses 10 of the ring groove 8 are sealing blocks 18. These blocks 18 are arranged so as to bridge the space which is formed at the meeting ends of the sections 16. Similar blocks 18 are mounted in the recesses 10 of the ring groove 9. One of the sides of the blocks 18 contact with the adjacent sides of the ring sections 16, and these sides of the blocks 18 are provided with arcuate rings 19, which fit into the arcuate grooves 17 formed in the end portions of the ring sections 16.

Mounted slidably in the ends of the guide 12 and in the short guides 13 are plungers 20. These plungers 20 have cylindrical portions 21, from the outer ends of which project semi-cylindrical portions 22. The flat sides of the semi-cylindrical portions 22 are provided with pivot studs 23. Extending inwardly from the cylindrical portions 21 of the plungers 20, are stems 24. The stems 24 are of less diameter than the portions 21.

The outer ends of the portions 21 of the plungers 20 bear against the inner edges of the ring sections 16, and the semi-cylindrical portions 22 of the plungers are disposed in the recesses 11 of the grooves 8 and 9 so that the pivot studs 23 fit in recesses 25 in the ring sections 16. Thus, the ring sections 16 are pivoted midway of their ends to the plungers 20.

In order to yieldably project the plungers 20 and therefore the ring sections 16 outwardly, spring means are mounted in the guides 12 and 13. In the guide 12, a single coil spring 26 is used. This spring 26 is comparatively long and extends from one end of the guide 12 to the other, having its end portions disposed around the stems 24 of the plungers 20 mounted in the ends of said guide 12 and having its extremities bearing against the shoulders which are formed at the junctions of the portions 21 of the plungers 20 with the stems 24 thereof. In each of the guides 13 comparatively short coil springs 27 are disposed. These coil springs 27 are confined between the end walls of the guides 13 and the shoulders which are formed at the junctions of the portions 21 of the plungers 20 and the stems 24 of the latter.

To assemble the device, the springs 26 and 27 must first be placed in their respective guides and the sealing blocks 18 should also be placed in the grooves 10. The plungers 20 should then be placed in their proper positions with respect to the ring sections 16 and the ring sections should be placed one by one in the proper ring grooves, so that the end portions of the ribs 19 will extend into and be disposed in the grooves 17 which are located in the ends of the sections 16. Since the plungers 20 slide in straight lines in their respective guides and since the ring sections 16 are connected by the studs 23 to the plungers, the plungers and the ring sections will only move in straight lines. By reason of this, the grooves 17 are slightly wider than the thickness of the ribs 19, so that the blocks 18 may be placed in order to permit their ribs 19 to have their end portions pass into the grooves 17 when the ring sections 16 are put in place in the ring grooves of the piston.

The ring sections 16 are preferably made of bronze or some material which will not unnecessarily wear away the wall of an engine cylinder, and since the outer edges of the sealing blocks 18 also engage the wall of an engine cylinder, the blocks 18 are preferably made of soft material such as aluminum. It is preferable to have the ribs 19 made of steel or other hard material, so that there will be no appreciable wear between the ring sections 16 and the sealing blocks 18. The ribs 19 are therefore made of steel or other hard material and are cast by a die casting process onto the blocks 18.

When the complete device is assembled and placed in an engine cylinder, the springs 26 and 27 will act at right angles to each other and force their respective ring sections 16 outwardly to maintain the piston 1 centered in the cylinder. As the inner surface of the engine cylinder or as the outer edges of the rings 15 wear, the springs 26 and 27 will keep forcing the complementary sections 16 of the packing rings farther and farther outwardly and thus compensate for such wear. As the complementary sections 16 of the rings 15 are forced outwardly by the springs, the inner edges of the grooves 17 will press upon and against the inner edges of the ribs 19 and force the sealing blocks 18 outwarlly, so that the outer edges of the sealing blocks 18 will be maintained at all times in engagement with the cylinder wall and will form a complete true circle with the complementary sections of the piston rings, regardless of how much wearing of the parts takes place. Furthermore, the rings 15 bear or press uniformly throughout their circumferential extent upon the cylinder wall. This is due to the manner in which the complementary sections 16 are connected at their meeting ends by the sealing blocks 18 and also to the manner in which the complementary sections 16 are connected to the plungers 20 so as to be caused to slide in straight lines. Thus, it will be seen that the sealing blocks 18 not only seal the joints of the rings and serve as tie pieces for the ring sections, but they also act as pressure equalizers and assist in causing the rings to bear or press uniformly upon the entire circumference of the cylinder wall.

By having the guides 13 comparatively short with their closed inner ends spaced a considerable distance apart, a space 14 is formed to accommodate the pivoted end of the connecting rod 5. This space is necessary where the piston or packing ringes 15 are to be placed upon a comparatively short piston.

The ring 7 located adjacent the head of the piston serves to prevent the charges in the engine cylinder from coming into contact with the rings 15, so that the latter are effectively protected from the charges in the engine cylinder. The grooves 8 and 9 are comparatively deep and the rings 15 are comparatively wide so that the piston is leak-proof.

From the foregoing description taken in connection with the accompanying drawings, the construction, use and advantages of the invention will be readily understood.

It is obvious that various changes in form, proportion, and in the minor details of construction may be resorted to without departing from the spirit and principle of the invention, and without sacrificing any of the advantages thereof, and hence it is to be understood that such changes may be made within the meaning and scope of the appended claims.

What is claimed is:

1. In a device of the class described, the combination of a piston having a packing ring grove, a packing ring disposed in said groove, said ring being made in two semicircular sections, sealing blocks mounted in said groove and bridging the spaces between the meeting ends of said sections, arcurate ribs disposed upon said sealing blocks, the ends of said sections being provided with arcuate grooves in which said ribs are received, said arcuate grooves being wider than said ribs are thick so as to permit insertion of said ribs into said arcuate grooves as said sections are placed in said ring groove, outwardly projected spring-pressed plungers mounted upon said piston and bearing upon the intermediate portions of said sections for yieldably forcing said sections outwardly, and means connecting said plungers to the intermediate portions of said sections.

2. A sealing block of the character described comprising a block made of soft material having an arcuate edge adapted to engage the wall of an engine cylinder, and a rib rigidly mounted upon one side of said block, said rib being made of comparatively hard material.

3. A sealing block of the character described comprising a block made of comparatively soft metal having one edge curved to engage the wall of a cylinder, and an arcuate rib of comparatively hard material cast upon one side of said block.

In testimony whereof I have hereunto affixed my signature.

MICHAEL H. SULLIVAN.